US008025080B2

(12) United States Patent
Orleskie et al.

(10) Patent No.: US 8,025,080 B2
(45) Date of Patent: Sep. 27, 2011

(54) ORIFICE PLATE ALIGNMENT DEVICE

(75) Inventors: Charles Theodore Orleskie, Berthoud, CO (US); Terry Xen Beachey, Longmont, CO (US); Jesse D. Paylor, Frederick, CO (US); Kevin Green, Evergreen, CO (US)

(73) Assignee: Dieterich Standard, Inc., Boulder, CO (US)

( * ) Notice: Subject to any disclaimer, the term of this patent is extended or adjusted under 35 U.S.C. 154(b) by 883 days.

(21) Appl. No.: 11/622,973

(22) Filed: Jan. 12, 2007

(65) Prior Publication Data

US 2007/0169828 A1     Jul. 26, 2007

Related U.S. Application Data

(60) Provisional application No. 60/761,658, filed on Jan. 24, 2006.

(51) Int. Cl.
    *F16L 55/10*     (2006.01)
(52) U.S. Cl. .............. 138/94; 138/44; 138/94.3
(58) Field of Classification Search .......... 138/94, 138/94.3, 94.5, 44
    See application file for complete search history.

(56) References Cited

U.S. PATENT DOCUMENTS

| | | | | |
|---|---|---|---|---|
| 1,575,259 A * | 3/1926 | Fisher | | 138/44 |
| 1,822,961 A * | 9/1931 | Emery | | 138/44 |
| 3,419,045 A * | 12/1968 | King, Jr. | | 138/44 |
| 3,781,043 A * | 12/1973 | Hagmann | | 285/363 |
| 4,002,344 A * | 1/1977 | Smith | | 277/609 |
| 4,079,746 A * | 3/1978 | Killian | | 137/315.22 |
| 4,503,594 A * | 3/1985 | Gall et al. | | 29/890.142 |
| 4,712,585 A * | 12/1987 | Evans | | 138/44 |
| 5,160,119 A * | 11/1992 | Lemire et al. | | 251/212 |
| 5,546,990 A * | 8/1996 | Wass et al. | | 138/44 |
| 6,260,853 B1 * | 7/2001 | Carr | | 277/609 |

* cited by examiner

*Primary Examiner* — James Hook
(74) *Attorney, Agent, or Firm* — Richard W. Hanes; Hanes Hrbacek & Bartels LLC

(57) ABSTRACT

A tool for supporting and centering a flat circular orifice plate flow meter between two pipe flanges that have circumferentially spaced apart circular flange bolt holes that lie on a bolt circle and receive circular flange bolts for interconnecting the flanges, comprising a flat plate having a first edge which includes at least two points that lie on a line of curvature having a radius equal to the radius of the circular orifice plate, and at least one set of at least two tool holes sized to receive two of the bolts that interconnect the flanges.

6 Claims, 6 Drawing Sheets

US 8,025,080 B2

ORIFICE PLATE ALIGNMENT DEVICE

This application claims the benefit of U.S. Provisional Application No. 60/761,658 filed on Jan. 24, 2006.

BACKGROUND OF THE INVENTION

Circular orifice plate fluid flow meters and flow conditioning plates are traditionally designed with a diameter that is compatible with the size and dimension of the specific pipe coupling flanges between which the orifice plate will be installed. Standard ANSI, DIN and JIS pipe flanges are designed with a variety of pressure ratings. For example ANSI standard flanges are classified as 150, 300, 600, 900, 1500 and 2500. For each of these ratings the flanges will have different dimensions and different number of bolt holes as well as different spacing and size of the holes comprising the bolt hole circle. Accordingly, for a given pipe line size, prior art orifice plates have had to be sized to fit the particular pressure rated flange pair being used in the application.

The requirement for centering an orifice plate so that its center is coaxial with the longitudinal center line of the pipes carrying the attachment flanges is well known. It is also acknowledged that visually performed alignment of a flow meter within its compressive mounting pipe flanges is time consuming and unreliable. Various alignment and centering devices have been proposed, including various gauges and installing tools. Such attempts are represented by U.S. Pat. No. 4,345,464 for Centering Device for Flowmeters Interposed in Flow Line and U.S. Pat. No. 5,632,632 for Flowmeter Alignment Device. The '464 patent discloses a pair of rectangular plates acting as camming devices that take advantage of the normal play present in a bolted pipe flange arrangement, The '632 patent discloses both a closed ring and an arc that are designed to mate with an edge of the raised face of a pipe flange. While adequate for a single pipe size and a single pressure rated pipe flange and flow meter, one of these devices of the prior art is not adapted for use with a large number of different pipe flanges.

It is therefore the primary object of the present invention to provide a selection of arcuate appliances that center and permanently support a single size of orifice plate within any one of a plurality of different pressure rated flange pairs that interconnect pipes of the same size.

SUMMARY OF THE INVENTION

The present invention provides one or more flat arcuate plates that function as tools to align the center of a flat circular orifice plate with the longitudinal axis of congruent pipe connecting flanges between which the orifice plate is to be compressively mounted. The flat plate comprises a first edge which includes at least two points that lie on a line of curvature having a radius equal to the radius of the circular orifice plate. The plate also has at least one set of at least two holes whose centers correspond to two adjacent bolt holes in the pipe flanges. The centers of the holes in the flat plate are spaced from the line of curvature of the plate's first edge a distance such that when the first edge of the plate is placed in contact with the outside edge of the orifice plate and the plate is sandwiched between the flanges and secured in place by the flange connecting bolts that pass through an appropriate set of bolt holes of the alignment plate the orifice plate will be centered within the fluid conducting pipe, that is, its center will be in alignment, or coaxial with, the longitudinal axis of the pipe.

DETAILED DESCRIPTION OF THE INVENTION

Figure 7:
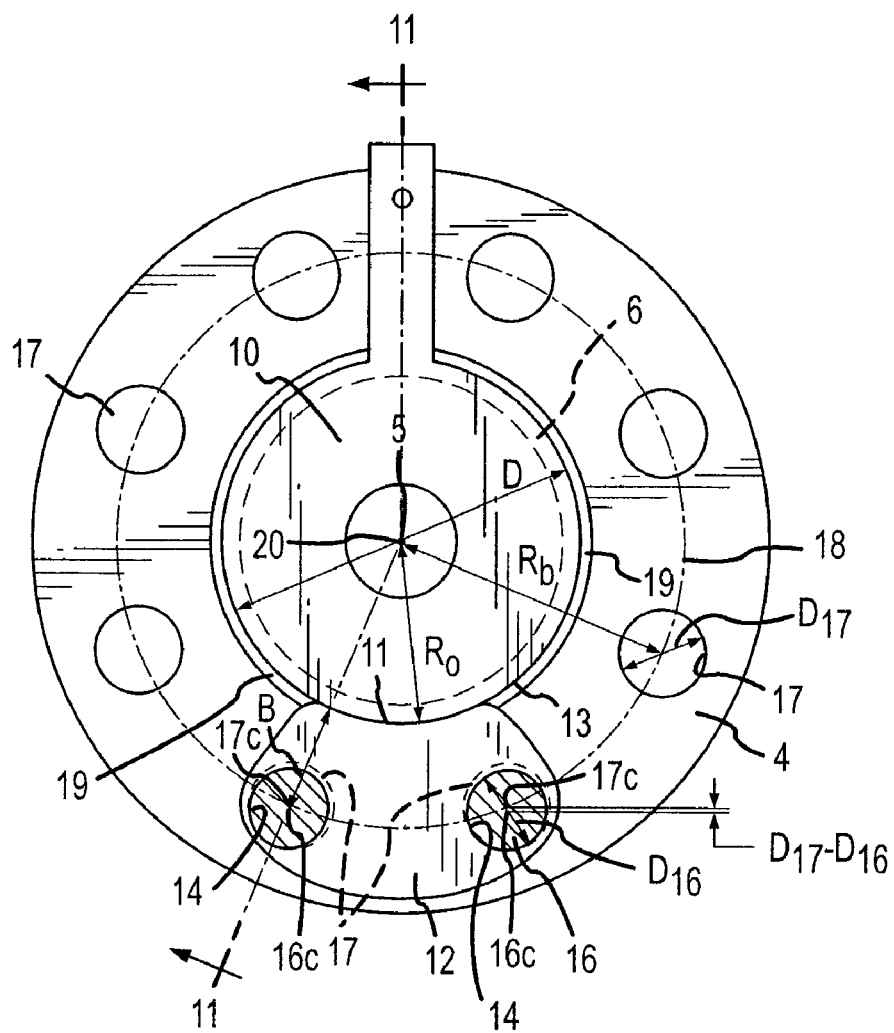
FIG. 7 is an end view of a pipe flange having a greater pressure rating than the flange shown in FIGS. 1-5. The flange is attached to the end of a pipe of similar size to the pipe shown in FIG. 5 with a same sized orifice plate as that shown in FIG. 5. The orifice plate is centered within the circle of the flange. An alignment tool designed only for this particular rated flange is shown with its bolt holes positioned over two adjacent holes in the bolt circle of the flange.
Figure 8:
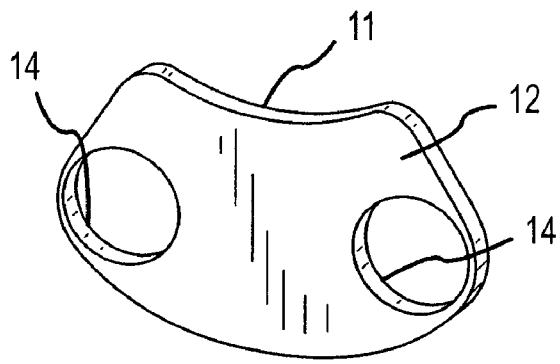
FIG. 8 is a perspective view of the alignment appliance shown in FIG. 7.

The most basic form of the flat plate alignment appliance of the present invention is shown in FIGS. 7 and 8. Only one of the pair of mating pipe flanges 4 is shown. Each of the pair of pipe flanges 4 is attached by welding or similar means to the end of a pipe or conduit 6. For purposes of comparative explanation the flange of FIG. 7 and the flanges of FIG. 11 will be considered high pressure rated flanges. An orifice plate fluid flow meter or flow conditioner 10 having an outside diameter D, larger than the inside diameter of the pipe 6, is centered within the circle formed by the flanges 4 and more specifically centered within the bolt circle 18. When so centered the center 5 of orifice plate 10 will be aligned with and on the longitudinal axis 22 of the pipe 6, which is the desirable placement of the orifice plate.

The centering alignment is accomplished by abutting the arcuate inner edge 11 of the flat plate 12 against the outside circumferential edge 13 of the orifice plate 10. The tool 12 is secured in place by sandwiching the plate between the flanges 4 and passing two adjacent flange connecting bolts 16 through the holes 14 in the plate 12. The line of curvature of the arcuate inner edge 11 of the plate 12 preferably matches the curvature of the circumferential edge 13 of the orifice plate 10. However, contacting the circumferential edge of the orifice plate with two widely spaced points on the inside edge of the alignment tool would be sufficient provided the points lie on a line a curvature that emulates the curvature of the orifice plate's edge.

Figure 11:
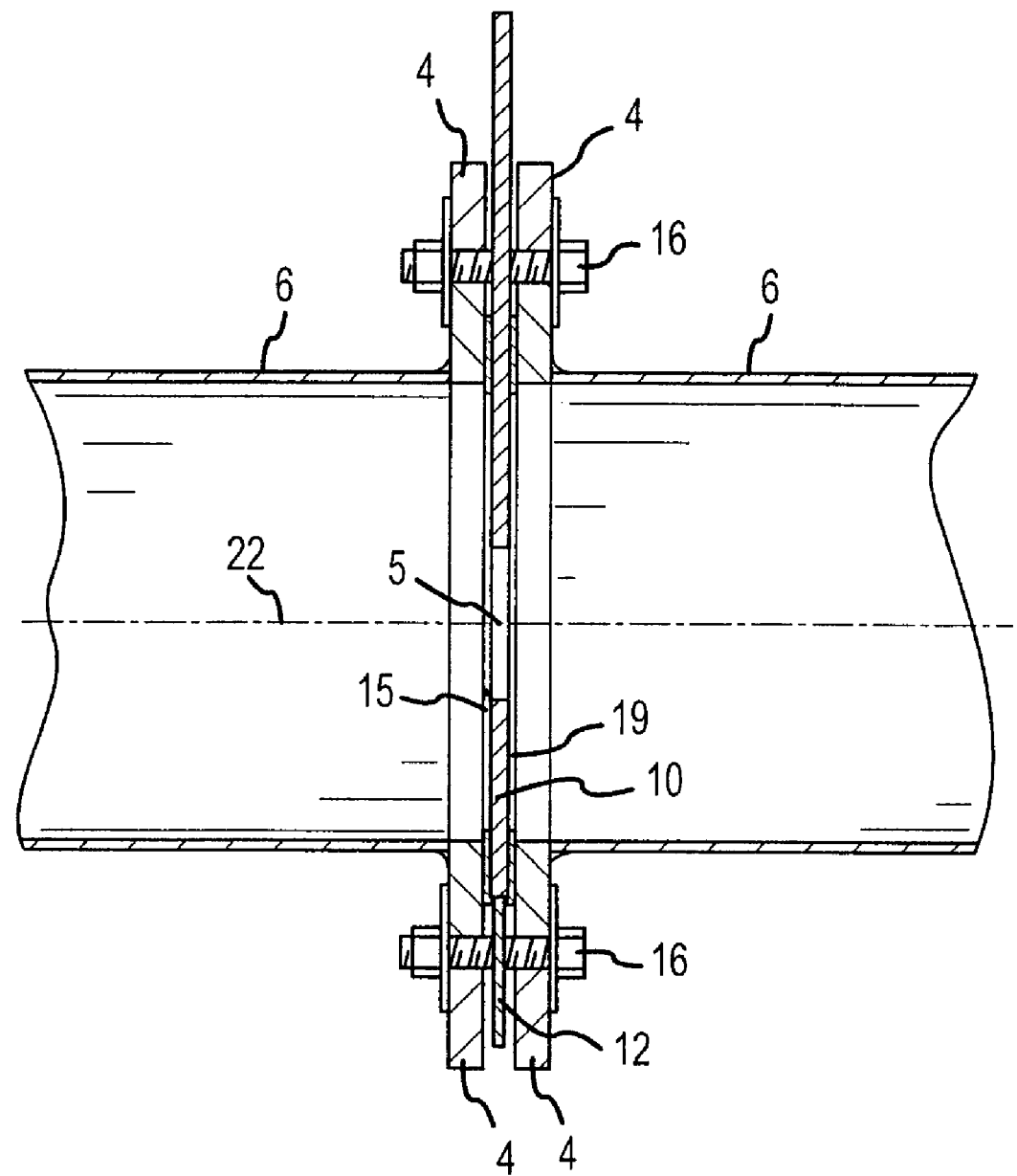
FIG. 11 is a cross sectional view of typical bolt connected pipe flanges where an orifice plate is compressively supported between the flanges. The alignment tool of the present invention is shown in cross section as it would appear compressed between a pair of mating pipe flanges, one of which is shown in FIG. 7, for example.

FIG. 11 is a cross sectional view taken along lines 11-11 of FIG. 7, illustrating the completed assembly of a pair of pipe flanges and the orifice plate and alignment tool sandwiched there between. As shown, the pipe flanges 4 are interconnected by bolts 16 that pass through bolt holes 17 of the flanges. Between the flanges is positioned an orifice plate 10 on either side of which are disposed sealing gaskets 15 and 19 that abut against the faces of the flanges 4. At a selected position on the circumference of the flanges two adjacent connecting bolts 16 pass through the holes 14 in the flat plate tool 12, securing it in place while it centers the orifice plate 10 within the flange circle and simultaneously aligns the center 5 of the orifice plate with the longitudinal axis 22 of the interconnected fluid carrying pipes 6.

Alignment of the center of the orifice plate with the centers of the flange pairs is achieved by sizing and dimensioning the flat plate appliance 12 and its bolt receiving holes 14. Traditionally, the diameter of flange bolt holes is somewhat larger than the diameter of the bolts intended to interconnect the flanges. This mismatch provides some leeway in interconnecting flanges that are not exactly perpendicular to the longitudinal axis of the pipes being connected.

Sizing and placement of the holes 14 in the alignment tool has three criteria. First, the diameter of the holes is the same as the diameter of the bolt that is intended to pass through the hole. Second, the location of each hole must be such that the holes correspond to the position of adjacent holes in the bolt hole circle of the flanges to the extent that adjacent bolts which interconnect the flanges can be passed through the appropriate holes 14 in the tool. Third, the holes in the tool must be placed so that when the interconnecting flange blots are placed through the flanges and the holes of the sandwiched tool and tightened, the tool will properly center the orifice plate with the center of the connected pipes. This third requirement demands that the holes in the tool be placed a precise distance from a reference point on the tool. The reference point may be a point lying on the edge of the tool and on a line that interconnects the center of the orifice plate 10 and the center of the proposed hole in the tool. To determine the distance from the reference point on the tool's edge to the center of the proposed hole several measurements must be taken into consideration, including accommodating the difference between the diameter of the flange bolt holes 17 and the smaller diameter of the connecting bolts 16. As seen in FIG. 7, that difference is equal to the distance between the center $16_c$ of the bolt 16 and the center $17_c$ of the flange bolt hole 17. Accordingly, the formula for placing the holes 14 in the flat plate is as follows: The distance B from the inside edge 11 of the flat plate to the center $16_c$ of a bolt hole in the plate, measured on a line interconnecting the center 5 of the orifice plate 10 and the center $16_c$ of a bolt hole in the plate 12 is equal to the difference between (a) the radius $R_b$ of the bolt hole circle 18 and (b) the radius $R_o$ of the orifice plate 10 plus (c) the difference between the diameter of the flange bolt hole $D_{17}$ and the diameter of the connecting bolt $D_{16}$. Expressed more simply, $B=R_b-R_o+D_{17}-D_{16}$. Thus when the inside edge 11 of the tool 12 is placed in abutting relation with the circumferential edge of the orifice plate 10 and two of the bolts 16 that interconnect the flanges are passed through the holes 14 and tightened the bolts 16 at the bottom portion of the flanges will move to a position where they contact the bottom edges of the flange bolt holes, as seen in FIG. 7. In this position the orifice plate 10 will be centered.

Figure 5:
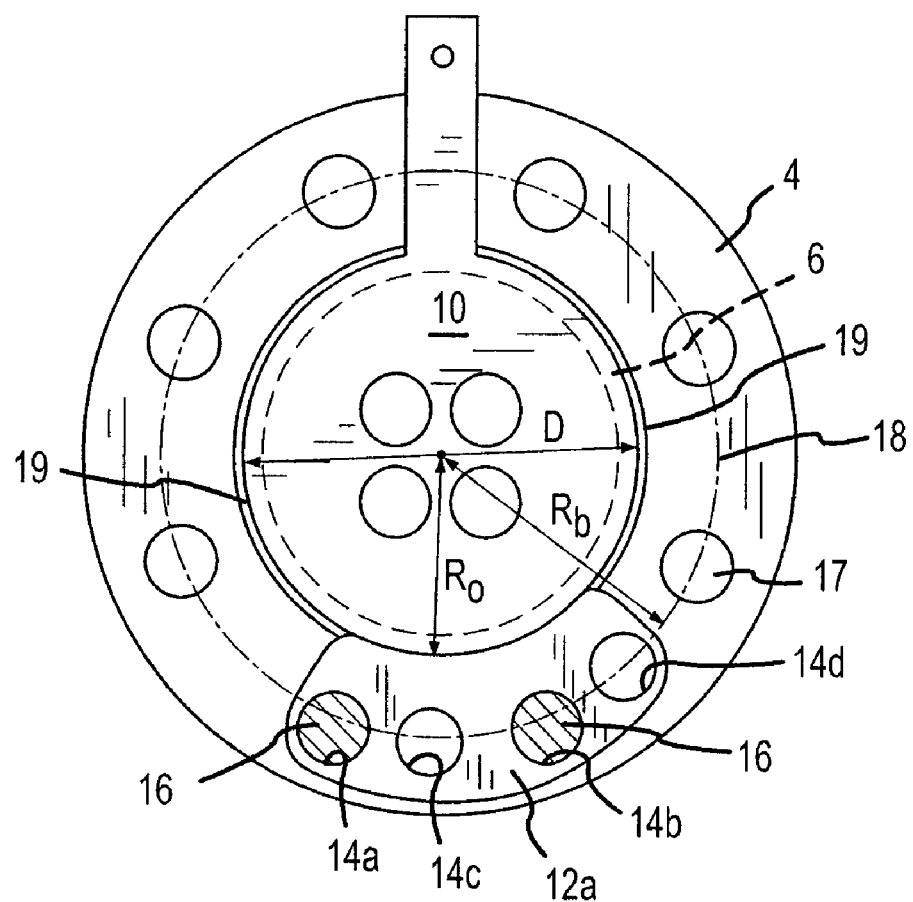
FIG. 5 is an end view of a pipe flange having a greater pressure rating than the flanges shown in FIGS. 1-3, for example ANSI 900 class. The flange is attached to the end of a pipe having the same line size as the pipes shown in FIGS. 1-3. An orifice plate of the same size as that shown in FIGS. 1-3 is centered within the circle defined by the pipe flange. The alignment tool of the present invention is shown positioned on the flange and in contact with an orifice plate of the same size as the orifice plate of FIGS. 1-3. The alignment tool illustrated in this Figure has two sets of bolt holes and is thereby adapted for use on two different pressure rated flanges.
Figure 6:
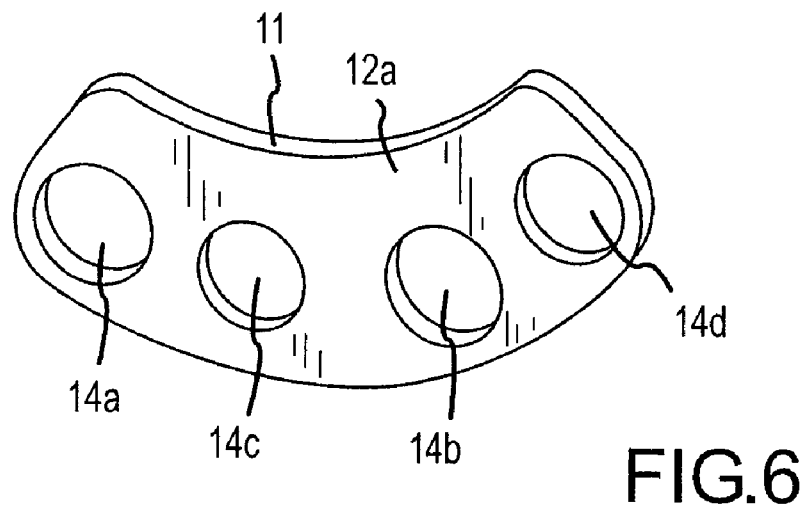
FIG. 6 is a perspective view of the alignment device shown in FIG. 5.

The concept of the alignment device of the present invention allows a single tool 12a, such as the one illustrated in FIGS. 5 and 6, to accommodate more than one flange size. For example, the tool shown in FIGS. 5 and 6 has two sets of holes. The first set comprises holes 14a and 14b while the second set includes holes 14c and 14d. The first set accommodates flanges rated in the ANSI 900 class, for example. The second set is designed to accommodate another size of flanges, for example ones in the ANSI 1,500 class.

Figure 3:
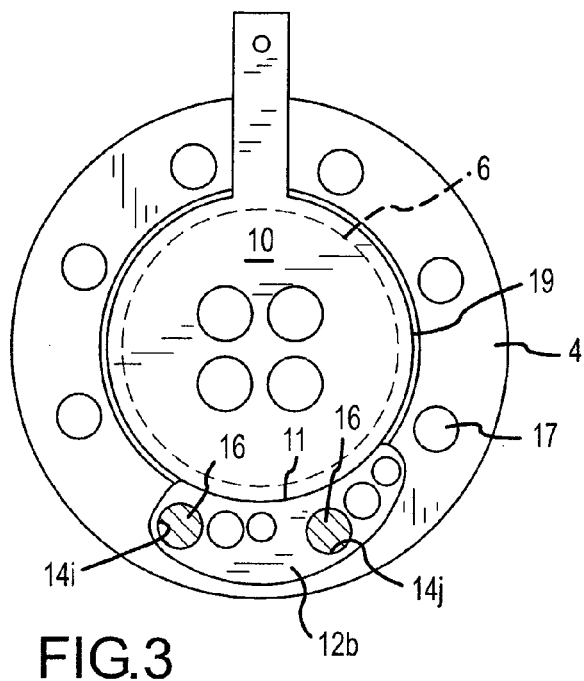
FIGS. 1-3 are end views of pipe flanges having respectively three different pressure ratings such as, for example, ANSI 150, 300 and 600 class. Different pressure rated flanges are shown attached to the ends of same sized pipes with same sized orifice plates centered within the circle of each pipe flange. Shown in plan view and placed on the respective flanges is the single flat plate alignment tool of the present invention that centers the orifice plate within the various sized flanges.
Figure 2:
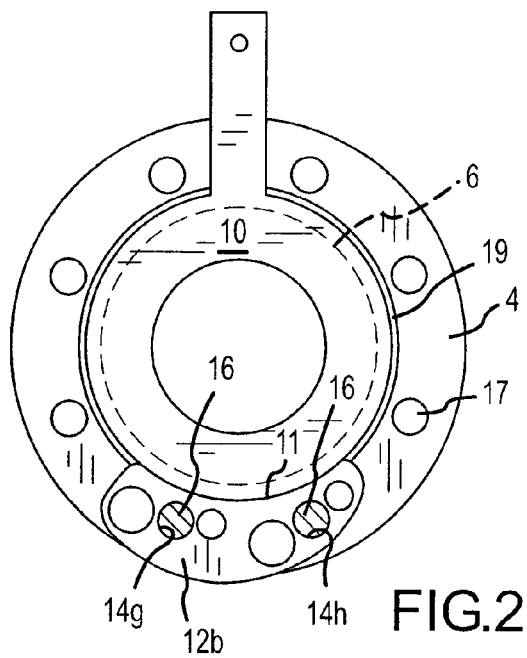
Figure 1:
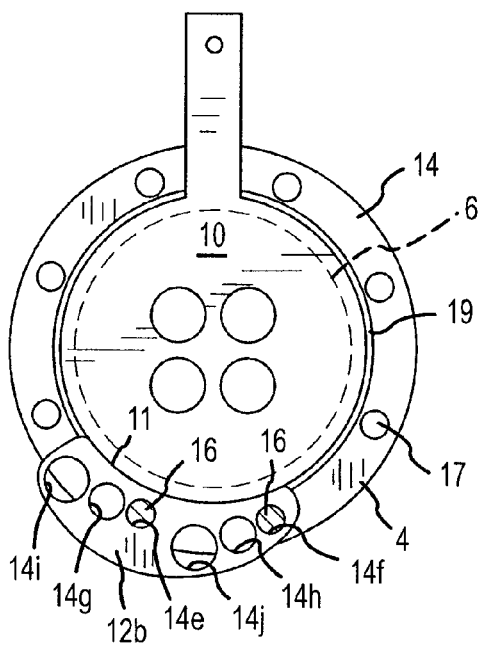
Figure 4:
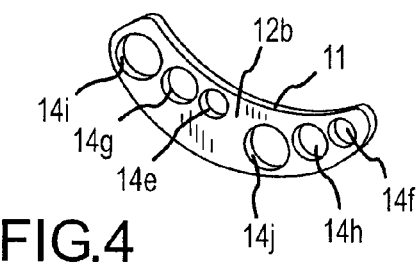
FIG. 4 is a perspective view of the alignment appliance shown in FIGS. 1-3.

Similarly, FIGS. 1-4 illustrate an alignment tool for flanges of lower pressure ratings where a single tool 12b may contain three sets of holes. The first set comprises holes 14e and 14f which, for example, may match the bolt holes in an ANSI 150 class flange, as shown in FIG. 1. The second set includes holes 14g and 14h that accommodate the bolt holes in a higher rated flange pair, such as the one shown in FIG. 2. A third set of holes 14i and 14j match the bolt holes in a still higher rated pair of flanges such ones in the ANSI 600 class, for example, shown in FIG. 3.

In each of the above referenced cases the holes in the alignment tool are sized and dimensioned as described for the single flange size alignment tool of FIG. 7. Accordingly, one to three or more different sizes of alignment tools can center a single sized orifice plate within a large selection of pressure rated flanges.

Figure 9:
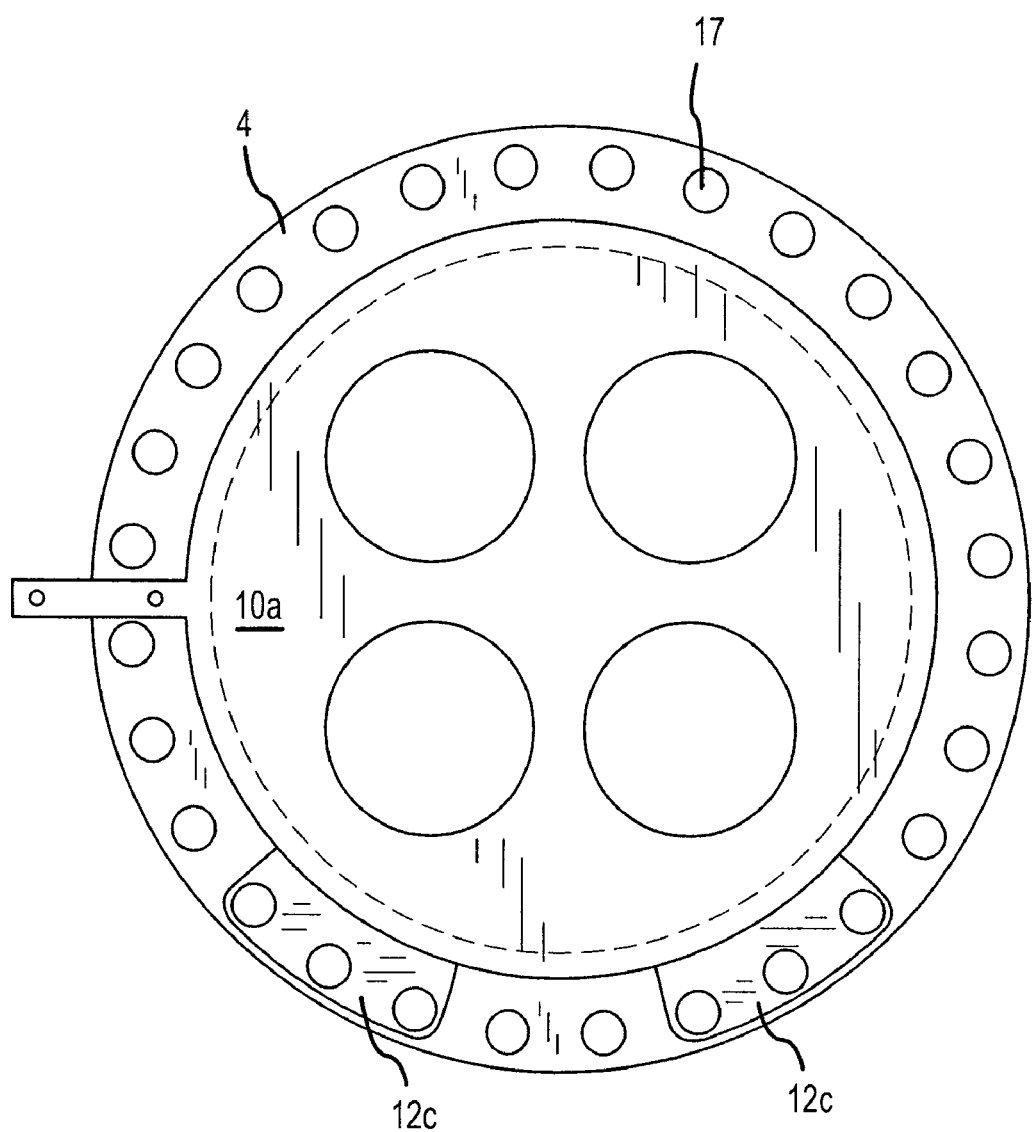
FIG. 9 is an end view of a pipe flange attached to a larger pipe than that shown in FIGS. 1-8 and supporting a larger orifice plate, illustrating that a larger diameter orifice plate may require the use of more than one flat plate alignment tool.
Figure 10:
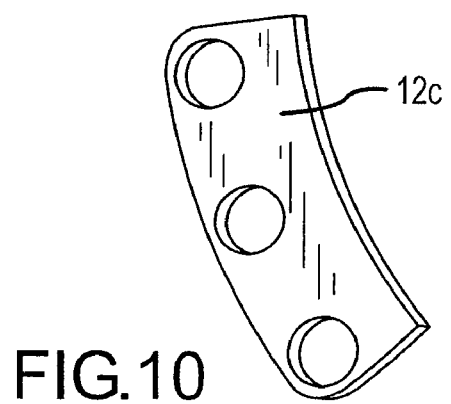
FIG. 10 is a perspective view of the alignment device shown in FIG. 9.

A large orifice plate, such as the one shown in FIG. 9 may require more that one alignment device 12c because of the reduced contact area between the edge 11 of the alignment devices and the circumferential edge of the orifice plate 10a.

Figure 12:
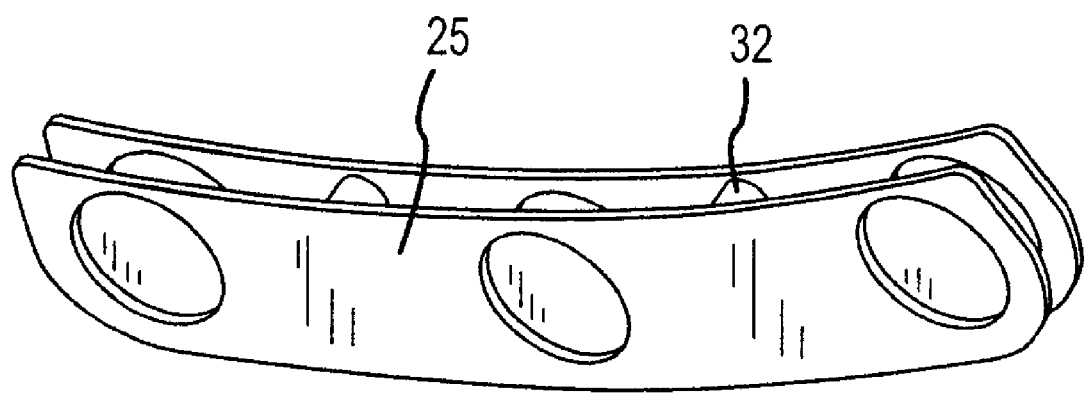
FIG. 12 is a perspective view of the widened double plate alignment tool for use with thicker orifice plates.

The thickness of the tool 12 is preferably the same or substantially the same thickness as the material of the orifice plate 10 in order to maintain a proper seal with the gaskets 19. FIG. 12 illustrates another embodiment 25 of the alignment tool for use with an orifice plate having greater thickness than the orifice plate illustrated in FIGS. 1-11. A preferred form of such a modified tool includes two flat plates of the above described configuration that are interconnected with rods 32. In all other respects, the tool of FIG. 12 is similar in its design and theory of operation as the tools described in connection with FIGS. 1-11.

What is claimed is:

1. A tool for supporting and centering a circular orifice plate flow meter between two pipe flanges that have circumferentially spaced apart flange bolt holes that receive flange bolts for interconnecting the flanges, comprising,
   a flat plate having,
      a first edge which includes at least two points that lie on an arc of a chord where the arc has a radius equal to the radius of the circular orifice plate and the chord defines the circumferential limits of the edge, and
      at least one set of at least two apertures sized to receive two of the bolts that interconnect the flanges.

2. The tool of claim 1, where the centers of the apertures are spaced from the line of curvature of the first edge a distance equal to the difference between (a) the radius of the flange bolt hole circle and (b) the radius of the orifice plate plus (c) the difference between the diameter of the flange bolt holes and the diameter of a flange connecting bolt.

3. The tool of claim 2 where the flat plate further includes, a plurality of sets of at least two apertures, each set of which corresponds in size and spacing with two of the bolt receiving holes in differently sized pipe flanges.

4. The tool of claim 1, where the flat plate further includes, a plurality of sets of at least two apertures, each set of which corresponds in size and spacing with two of the bolt receiving apertures in differently sized pipe flanges.

5. The tool of claim 1, where the flat plate has a thickness substantially similar to the thickness of the circular orifice plate flow meter.

6. The tool of claim 1 where the at least two apertures are disposed to receive the flange bolts in adjacent flange bolt holes.

\* \* \* \* \*